US012774722B2

(12) United States Patent
Escudero Hernandez

(10) Patent No.: US 12,774,722 B2
(45) Date of Patent: Oct. 27, 2026

(54) JOINT ASSEMBLY FOR A VEHICLE

(71) Applicant: NISSAN NORTH AMERICA, INC., Franklin, TN (US)

(72) Inventor: Diego Eder Escudero Hernandez, Toluca (MX)

(73) Assignee: NISSAN NORTH AMERICA, INC., Franklin, TN (US)

( * ) Notice: Subject to any disclaimer, the term of this patent is extended or adjusted under 35 U.S.C. 154(b) by 185 days.

(21) Appl. No.: 18/911,047

(22) Filed: Oct. 9, 2024

(65) Prior Publication Data

US 2026/0098566 A1 Apr. 9, 2026

(51) Int. Cl.
*F16D 3/84* (2006.01)

(52) U.S. Cl.
CPC .................................... *F16D 3/84* (2013.01)

(58) Field of Classification Search
CPC ........ F16D 3/2055; F16D 3/223; F16D 3/845; F16D 3/843; F16D 2003/22313; B60B 27/0042; B60B 27/0094; B60B 27/0005; Y10T 403/1608
See application file for complete search history.

(56) References Cited

U.S. PATENT DOCUMENTS

| | | | | |
|---|---|---|---|---|
| 2,226,388 A * | 12/1940 | Richter | F16J 3/045 403/50 |
| 5,312,300 A * | 5/1994 | McGregor | F16J 3/043 464/175 |
| 7,104,893 B2 * | 9/2006 | Ouchi | B21K 25/00 464/178 |
| 7,758,433 B2 * | 7/2010 | Yamauchi | F16J 3/041 464/178 |
| 8,480,306 B2 * | 7/2013 | Fukumura | B60B 27/00 384/537 |
| 9,261,145 B2 * | 2/2016 | Nakagawa | F16D 1/072 |
| 12,092,169 B2 | 9/2024 | Escudero Hernandez | |
| 2001/0004611 A1 * | 6/2001 | Sahashi | B60B 27/00 464/145 |
| 2009/0239669 A1 | 9/2009 | Yamauchi | |
| 2014/0361606 A1 * | 12/2014 | Mochinaga | F16D 1/072 301/109 |

FOREIGN PATENT DOCUMENTS

WO 2008068902 A1 6/2008

* cited by examiner

*Primary Examiner* — Daniel J Wiley
(74) *Attorney, Agent, or Firm* — Spencer Fane, LLP

(57) ABSTRACT

A joint assembly for a vehicle includes an outer race, a fitting, a shaft, and a stop member. The fitting is disposed in the outer race. The fitting is configured to be axially movable and rotationally fixed relative to the outer race. The shaft is received by the fitting. The stop member substantially prevents axial movement of the fitting. A first end of the stop member is removably received by the outer race. A second end of the stop member is connected to the shaft.

18 Claims, 5 Drawing Sheets

JOINT ASSEMBLY FOR A VEHICLE

BACKGROUND

Technical Field

The present disclosure generally relates to a joint assembly for a vehicle. More specifically, the present disclosure relates to a stop member that substantially prevents axial movement of a fitting of a joint assembly for a vehicle.

Background Information

A conventional joint assembly 10 for a vehicle includes a fitting 12 received by an outer race 14, as shown in FIG. 1. The fitting 12 is axially movable relative to the outer race 14. The fitting 12 receives a drive shaft 16. A boot 18 is connected to the drive shaft 16 and to the outer race 14. During shipping and assembly prior to final installation of the drive shaft in the vehicle, the fitting 12 can move axially within the outer race 14 and contact the boot 18, thereby damaging the joint assembly 10.

SUMMARY

A need exists for a joint assembly for a vehicle in which axial movement of a fitting is substantially prevented during shipping and assembly prior to final installation of the drive shaft in the vehicle.

In view of the state of the known technology, one aspect of the present disclosure is to provide a joint assembly for a vehicle. The joint assembly includes an outer race, a fitting, a shaft, and a stop member. The fitting is disposed in the outer race. The fitting is configured to be axially movable and rotationally fixed relative to the outer race. The shaft is received by the fitting. The stop member substantially prevents axial movement of the fitting. A first end of the stop member is removably received by the outer race. A second end of the stop member is connected to the shaft.

Another aspect of the present disclosure is to provide a joint assembly for a vehicle in which the joint assembly includes an outer race, a fitting, a shaft, a boot, a retaining member, and a stop member. The fitting is disposed in the outer race. The fitting has an opening. The fitting is configured to be axially movable and rotationally fixed relative to the outer race. The shaft is received by the opening in the fitting. The boot has a first end connected to the shaft and a second end connected to the outer race. The retaining member is received by the shaft. The stop member substantially prevents axial movement of the fitting toward the boot. A first end of the stop member is removably received by the outer race. A second end of the stop member is received by the retaining member.

Also other objects, features, aspects and advantages of the disclosed joint assembly for a vehicle will become apparent to those skilled in the art from the following detailed description, which, taken in conjunction with the annexed drawings, discloses exemplary embodiments of the joint assembly for a vehicle.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
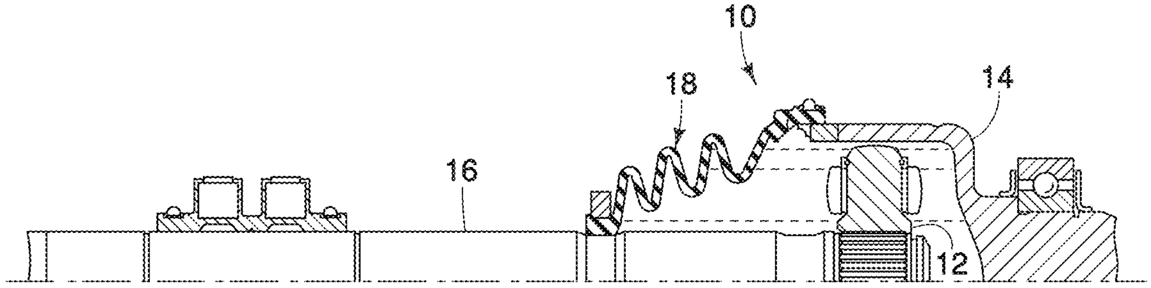
FIG. 1 (PRIOR ART)
FIG. 1 is an elevational view of a conventional joint assembly for a vehicle.
Figure 2:
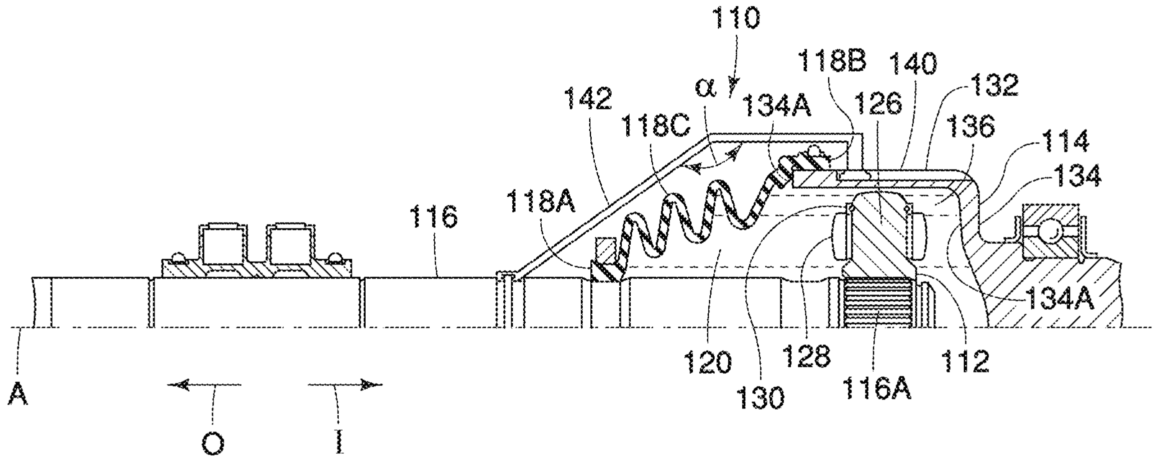
FIG. 2 is an elevational view of a joint assembly for a vehicle in accordance with an exemplary embodiment.

Referring initially to FIG. 2, a joint assembly 110, such as a constant velocity joint, is illustrated in accordance with an exemplary embodiment of the present disclosure. The joint assembly 110 includes a fitting 112 disposed in an outer race 114. The fitting 112 is configured to be axially movable and rotationally fixed relative to the outer race 114. A splined, or drive, shaft 116 is received by the fitting 112 such that rotation of the outer race 114 is transferred to the drive shaft 116 by the fitting 112. A boot 118 is connected to drive shaft 116 and to the outer race 114. The boot 118 can be connected in any suitable manner, such as with a clamp or by a fastener. A cavity 120 is defined by the boot 118 and the outer race 114. A lubricating material is disposed in the cavity 120 to lubricate the joint assembly 110.

Figure 5:
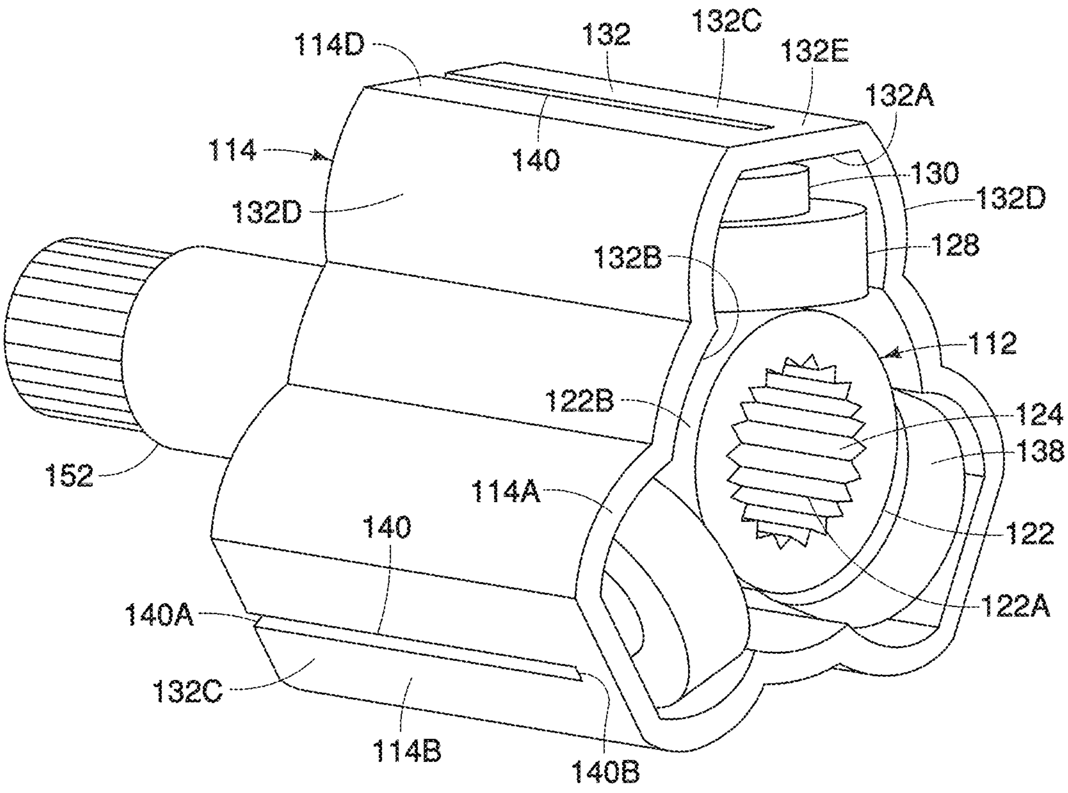
FIG. 5 is a perspective view of an outer race of FIG. 2 receiving a fitting.

The fitting 112 includes a spider support member, or yoke, 122 having an inner surface 122A and an outer surface 122B, as shown in FIG. 5. The inner surface 122A defines an opening 124 that receives the drive shaft 116. The inner surface 122A is preferably splined to receive a splined end 116A of the drive shaft 116 to rotationally fix the drive shaft 116 to the spider support member 122 of the fitting 112, as shown in FIGS. 2 and 5. A plurality of trunnions 126 extend outwardly from the outer surface 122B of the spider support member 122. The fitting 112 is preferably a tripod joint, such that three trunnions 126 extend outwardly from the outer surface 122B of the spider support member 122. A roller 128 is rotatably received by each of the trunnions 126. A needle bearing 130 is disposed between the trunnion 126 and the roller 128 to allow the roller 128 to rotate with respect to the trunnion 126.

Figure 3:
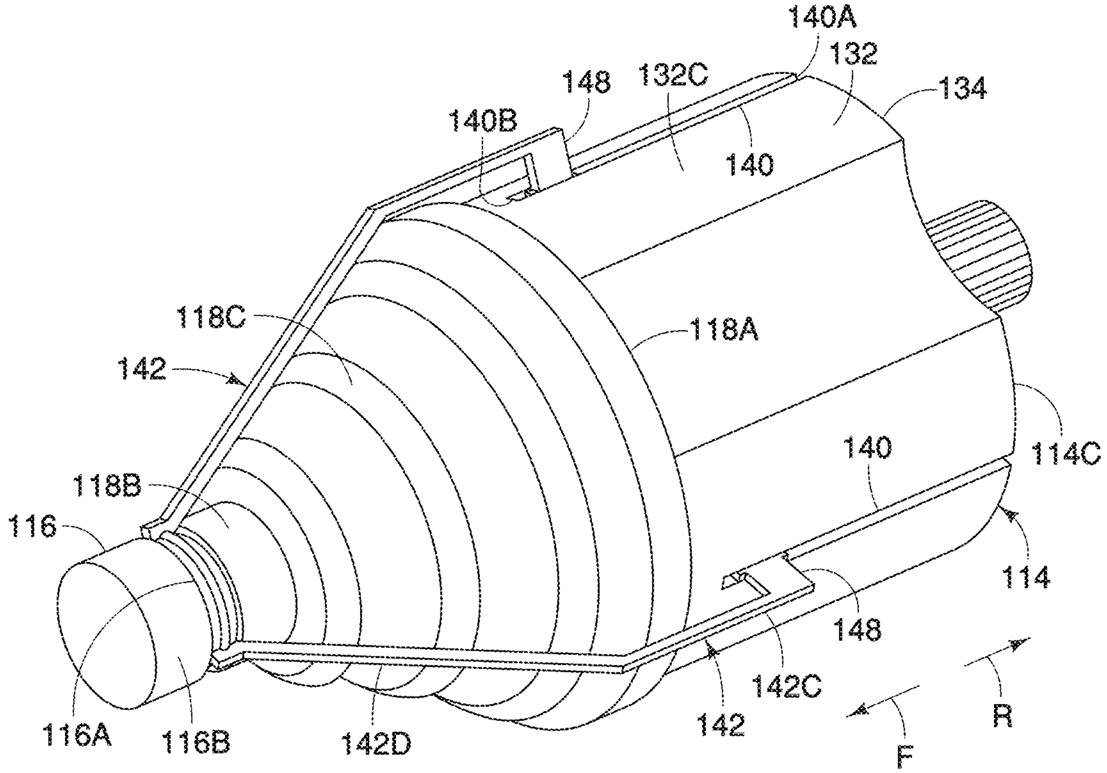
FIG. 3 is a perspective view of the joint assembly of FIG. 2.

The outer race 114 includes a wall 132 that extends axially from a base 134, as shown in FIGS. 2, 3 and 5. The base 134 extends substantially perpendicularly to a rotational axis A of the drive shaft 116. The wall 132 extends substantially parallel to the rotational axis A of the drive shaft 116. The base 134 and the wall 132 of the outer race 114 define a receiving area 136 within which the fitting 112 is axially movable. A plurality of fitting receiving portions 132A are formed in an inner surface 132B of the wall 132 of the outer race 114 to receive the trunnions 126 and the rollers 128 of the fitting 112. The base 134 defines a first end 114C of the outer race 114. The outer race 114 is preferably made of a metallic material, such as steel, but can be made of any suitable material.

Figure 4:
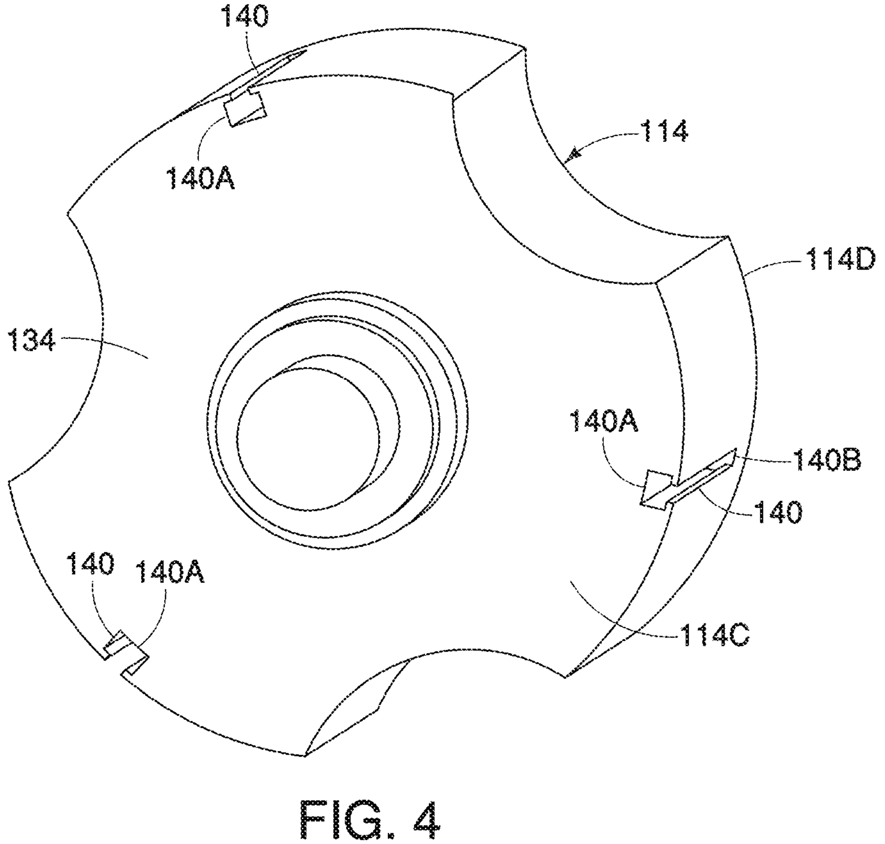
FIG. 4 is a rear perspective view of the outer race of the joint assembly of FIG. 2.

A free end of the wall 132 defines an axial face 114A of the outer race 114, as shown in FIGS. 3 and 4. An opening 138 is formed in the axial face 114A of the outer race to receive the fitting 114 and the drive shaft 116. The axial face 114A defines a second end 114D of the outer race 114.

A groove 140 extends in an axial direction in an outer surface 132C of the wall 132, as shown in FIGS. 3 and 4. The outer surface 132C of the wall 132 defines an outer surface 114B of the outer race 114. In other words, the groove 140 extends axially in the outer surface 114B of the outer race 114. A first end 140A of the groove 140 is disposed at the first end 114C of the outer race 114. A second end 140B of the groove 140 is disposed at the second end 114D of the outer race 114. The second end 140B of the groove 140 is spaced from the second end 114D of the outer race 114. The groove 140 extends axially from the first end 114C toward the second end 114D of the outer race 114. At least one groove 140 is disposed in the outer surface 114B of the outer race 114. Preferably, a groove 140 is disposed in an outer surface 114B of the outer race defining the fitting receiving portions 132A. As shown in FIG. 4, three grooves 140 are disposed in the outer surface 114B of the outer race 114. The outer race 114 can have any suitable number of grooves 140. Each groove 140 is substantially similarly formed.

The boot 118 is connected to the drive shaft 116 and to the outer race 114, as shown in FIGS. 2 and 3 in a conventional manner. A first end 118A of the boot 118 is connected to an outer surface of the outer race 114. A second end 118B of the boot 118 is connected to an outer surface 116B of the drive shaft 116. A lubricating material, such as grease, is disposed in the cavity 120 defined by the boot 118 and the outer race 114. The boot 118 is preferably made of a flexible material that flexes to accommodate movement of the drive shaft 116 relative to the outer race 114.

Figure 8:
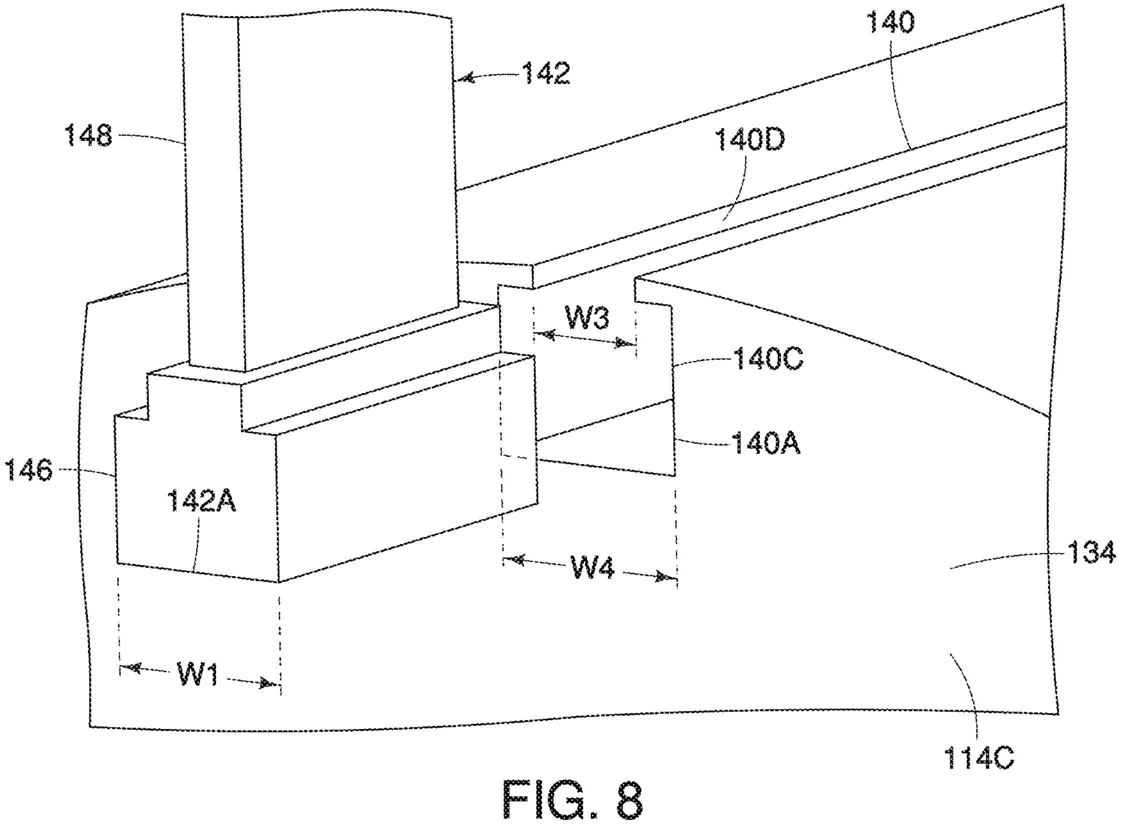
FIG. 8 is a perspective view of a stop member being inserted in a groove in an outer surface of an outer race of the joint assembly of FIGS. 2 and 3.
Figure 9:
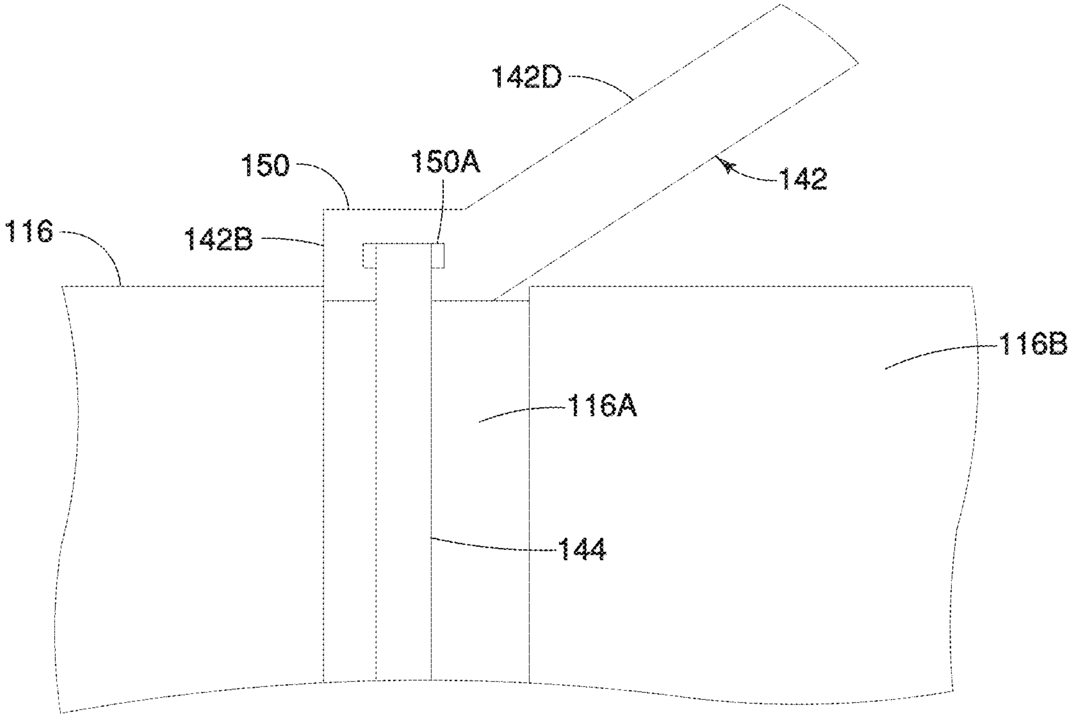
FIG. 9 is an elevational view of a stop member and a retaining member received by a circumferential groove in an outer surface of a shaft of the joint assembly of FIGS. 2 and 3.

A stop member 142 is connected to the outer race 114 and to the shaft 116, as shown in FIG. 2, to substantially prevent axial movement of the fitting 112. A first end 142A of the stop member 142 is removably received by the outer race 114. A second end 142B of the stop member 142 is connected to the shaft 116. As shown in FIG. 8, the first end 142A of the stop member 142 is removably received by the groove 140. As shown in FIG. 9, the second end 142B of the stop member 142 is received by a circumferential groove 116A in an outer surface 116 of the shaft 116. The circumferential groove 116A extends continuously around a circumference of the shaft 116. The circumferential groove 116A substantially prevents axial movement of the second end 142B of the stop member 142.

Figure 6:
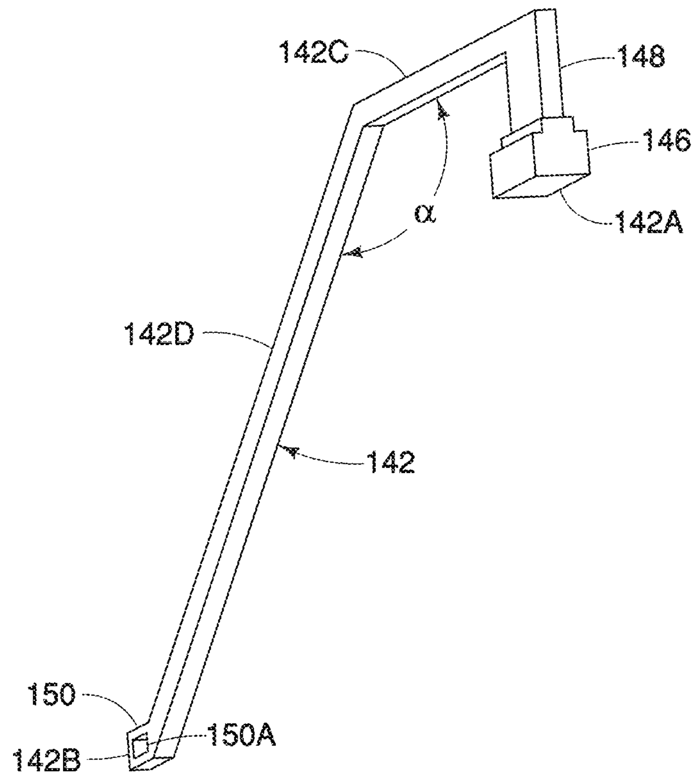
FIG. 6 is a perspective view of a stop member of the joint assembly of FIGS. 2 and 3.
Figure 7:
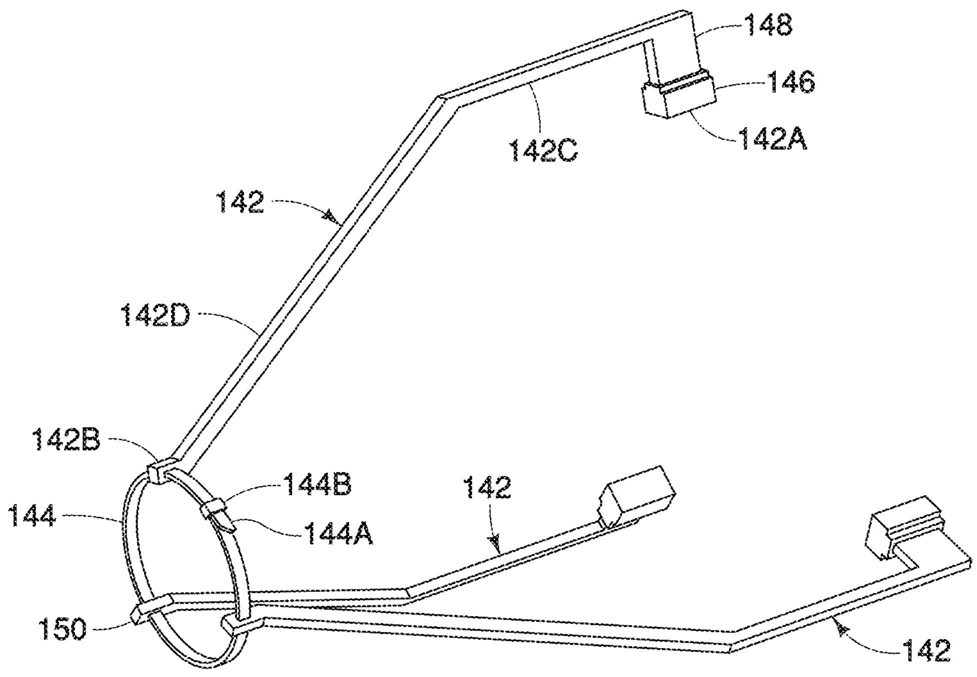
FIG. 7 is a perspective view of the stop members and a retaining member of the joint assembly of FIGS. 2 and 3.

The stop member 142 includes a first portion 142C extending from the first end 142A, as shown in FIGS. 3, 6 and 7. The stop member 142 includes a second portion 142D extending between the first portion 142C and the second end 142B. The first portion 142C extends substantially parallel to the rotational axis A of the shaft 116, as shown in FIGS. 2 and 3. The second portion 142D extends angularly from the first portion 142C of the stop member 142. An angle $\alpha$ is formed between the first portion 142C and the second portion 142D. The angle $\alpha$ is preferably larger than zero degrees and less than 180 degrees. More preferably, the angle $\alpha$ is preferably between 90 degrees and 180 degrees.

The stop member 142 is preferably unitarily formed as a one-piece member. The stop member 142 is preferably made of a non-metallic material, such as a plastic material, such as nylon or nylamid. One stop member 142 is received by each of the grooves 140 in the outer race 114. Each stop member 142 is substantially identically formed.

A retaining member 144 is received by the second end 142B of the stop member 142, as shown in FIGS. 3 and 9, to facilitate securing the stop member 142 to the shaft 116. The retaining member is preferably a conventional cable tie. The retaining member 144 is preferably integrally formed as a one-piece member. Preferably, the retaining member is made of a non-metallic material, such as plastic, such as nylon.

The stop member 142 includes a guide member 146 disposed at the first end 142A of the stop member 142, as shown in FIG. 8. A first width W1 of the guide member 146 is larger than a second width W2 of a connecting portion 148 of the stop member 142. The connecting portion 148 connects the guide member 146 to the first portion 142 of the stop member 142. The first width W1 of the guide member 146 is larger than a third width W3 of the groove 140 to prevent inadvertent removal of the guide member 146 from the groove 140 in a radial direction.

The stop member 142 includes a receiving portion 150 disposed at the second end 142B of the stop member 142, as shown in FIGS. 7 and 9. The receiving portion 150 is angularly disposed relative to the second portion 142D of the stop member 142. The receiving portion 150 of the stop member 142 includes an opening 150A configured to receive the retaining member 144. The opening 150A is completely surrounded by the receiving portion 150 to substantially prevent inadvertent removal of the retaining member 144 from the stop member 142.

To assemble the joint assembly 110, the fitting 112 is disposed in the receiving area 136 of the outer race 114, as shown in FIG. 5. Curved portions 132D of the wall 132 immediately adjacent each planar portion 132E are curved to accommodate the roller 128 of the fitting 112. The curved portions 132D of the wall 132 of the outer race 114 allow the rollers 128 to rotate, such that the fitting 112 can move axially within the receiving area 136 of the fitting 112. The curved portions 132D of the wall 132 further prevent rotation of the fitting 112 relative to the outer race 114, such that rotation of the outer race 114 rotates the fitting 112. As shown in FIG. 2, the fitting 112 moves axially in the outboard direction O and the inboard direction I. The fitting 112 is axially movable and rotationally fixed relative to the outer race 114.

The drive shaft 116 is inserted in the opening 124 in the yoke 122 such that the splines 116A of the drive shaft 116 engage the splines disposed on the inner surface 122A of the yoke 122, as shown in FIGS. 2 and 5. Rotation of the outer race 114 through a shaft 152, as shown in FIG. 5, rotates the fitting 112, which in turn rotates the drive shaft 116. The shaft 152 is connected to the fitting 112 in a conventional manner. Rotation of the drive shaft 116 rotates a wheel (not shown) of the vehicle.

The boot 118 is connected to the drive shaft 116 and to the end cap 138, as shown in FIG. 2 in a conventional manner. A lubricating material, such as grease, is disposed in the cavity 120 defined by the boot 118 and the outer race 114. The boot 118 is preferably made of a flexible material that flexes to accommodate movement of the drive shaft 116 relative to the outer race 114.

The guide member 146 of the stop member 142 is inserted in the first end 140A of the groove 140 through the base 134 of the outer race 114, as shown in FIG. 8. The groove 140 has a first portion 140C and a second portion 140D. A fourth width W4 of the first portion 140C of the groove 140 is larger than the third width W3 of the second portion 140D of the groove 140. The first portion 140C of the groove 140 receives the guide member 146 of the stop member. The second portion 140D of the groove 140 receives the connecting portion 148 of the stop member 140. The third width W3 of the second portion 140D of the groove 140 is smaller than the first width W1 of the guide member 146 to prevent the guide member 146 from passing through the second portion 140D of the groove 140. A guide member 146 is similarly disposed in each of the grooves 140 in the outer race 114.

The retaining member 144 initially has a substantially linear shape. A free end 144A of the retaining member is then sequentially passed through each opening 150A in the receiving portion 150 of the stop member 142, as shown in FIGS. 7 and 9. After passing the retaining member 144 through each of the openings 150A, the receiving portion 150 of the stop member 150 is disposed in the circumferential groove 116A in the outer surface 116B of the shaft 116. The free end 144A of the retaining member 144 is then passed through a ratchet 144B, or locking member, of the retaining member 144 to secure the second end 142B of the stop member 142 to the shaft 116. As shown in FIGS. 2 and 3, the stop member 142 is spaced from the boot 118. In other words, lower surfaces of the first portion 142C and the second portion 142D of the stop member 140 are spaced from an outermost surface 118C of the boot 118.

Movement of the shaft 116 in the first direction F is limited by the stop member 142 contacting the second end 140B of the groove 140, as shown in FIG. 3. The second end 140B of the groove 140 prevents further axial movement beyond the position of the fitting 112 when the stop member 142 contacts the second end of the groove 140. The stop member 142 substantially limits axial movement of the fitting 112 that would contact the boot 118 during transportation of the joint assembly 110. By substantially limiting axial movement of the fitting 112, damage to the boot 118 by movement of the fitting 112 during transportation is substantially eliminated. The axial length of the groove 140 limits the axial movement of the fitting 112. Axial movement of the fitting 112 in a second direction R is limited by the fitting 112 contacting an inner surface 134A of the base 134 of the outer race 114.

After the joint assembly 110 has been shipped and received, assembly of the vehicle is finalized. The retaining member 144 is severed, and each of the stop members 142 is moved in the second direction R through the grooves 140. The guide member 146 is moved out through the open first end 140A of the groove. The stop member 142 can be saved for future use.

Another exemplary embodiment of the joint assembly for a vehicle is shown in FIG. 9. The features of the joint assembly 110 of FIG. 9 that are substantially similar to the features of the joint assembly 10 of FIGS. 2-8 are provided the same reference numerals as the features of the joint assembly 10 except in the 100 series (i.e., 1*xx*). Moreover, the descriptions of the parts of the joint assembly of FIG. 9 that are identical to the joint assembly of FIGS. 2-8 are omitted for the sake of brevity.

Figure 10:
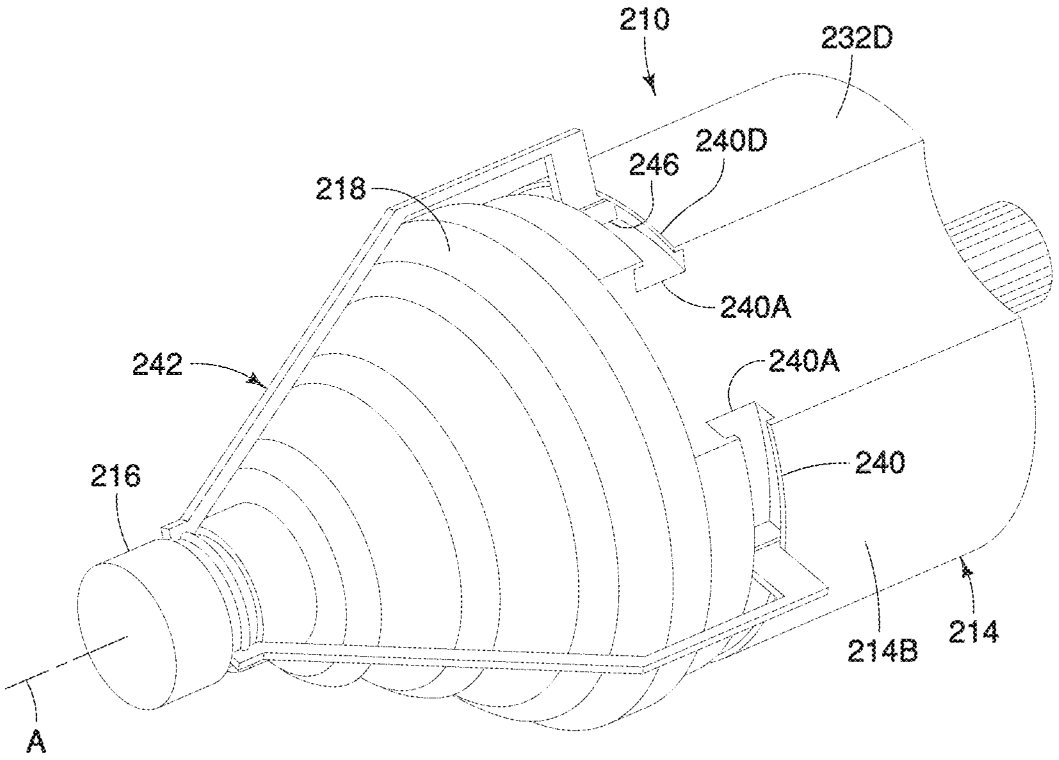
FIG. 10 is a perspective view of a joint assembly for a vehicle in accordance with another exemplary embodiment.

The joint assembly 210 includes a plurality of circumferentially extending grooves 240 that extend circumferentially around an outer surface 214B of the outer race 214, as shown in FIG. 10. Each of the circumferential grooves 240 is disposed in a curved portion 232D of the outer race 214. The stop member 242 is inserted from either end 240A of the circumferential groove 240A. The stop member 242 is disposed in any suitable position along the circumferential length of the groove 240.

An axial length of a guide member 246 of a stop member 242 is larger than an axial length of an upper portion 240D of the circumferential groove 240. The larger axial length of the guide member 246 prevents the stop member 242 from being inadvertently removed from the circumferential groove 240. The other end of the stop member 242 is connected to the drive shaft, similarly to the stop member 142 of FIGS. 2-8.

The circumferential groove 240 limits axial movement of the stop member 242 such that axial movement of the fitting 112 (FIG. 2) and the drive shaft 116 (FIG. 2) is substantially prevented. Limiting the movement of the fitting and the drive shaft during shipping substantially prevents damage to the boot 218.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of the joint assembly for a vehicle. Accordingly, these terms, as utilized to describe the present invention should be interpreted relative to the joint assembly for a vehicle.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A joint assembly for a vehicle comprising:
an outer race comprising a groove, the groove extending either axially or circumferentially on an outer surface of the outer race;
a fitting disposed in the outer race, the fitting being configured to be axially movable and rotationally fixed relative to the outer race;
a shaft received by the fitting; and
a stop member substantially preventing axial movement of the fitting,
a first end of the stop member engaging with the groove and being removably received by the outer race either by axial or circumferential motion of the stop member with respect to the outer race, and
a second end of the stop member being connected to the shaft.

2. The joint assembly according to claim 1, wherein
a groove extends axially in an outer surface of the outer race.

3. The joint assembly according to claim 1, wherein
a retaining member is received by the second end of the stop member to facilitate securing the stop member to the shaft.

4. The joint assembly according to claim 3, wherein
the second end of the stop member is received by a circumferential groove in an outer surface of the shaft, the circumferential groove substantially preventing axial movement of the second end of the stop member.

5. The joint assembly according to claim 3, wherein
an opening in the stop member receives the retaining member.

6. The joint assembly according to claim 1, wherein
the outer race has a first end and a second end, the groove extending axially from the first end toward the second end of the outer race.

7. The joint assembly according to claim 6, wherein
a first end of the groove is disposed at the first end of the outer race, and a second end of the groove being spaced from the second end of the outer race.

8. The joint assembly according to claim 1, wherein a guide member is disposed at the first end of the stop member, a first width of the guide member being larger than a second width of the groove.

9. The joint assembly according to claim 1, wherein
the stop member is made of a non-metallic material.

10. A joint assembly for a vehicle comprising:
an outer race comprising a groove, the groove extending either axially or circumferentially on an outer surface of the outer race;
a fitting disposed in the outer race, the fitting having an opening, the fitting being configured to be axially movable and rotationally fixed relative to the outer race;
a shaft received by the opening in the fitting;
a boot having a first end connected to the shaft and a second end connected to the outer race;
a stop member substantially preventing axial movement of the fitting toward the boot,
a first end of the stop member engaging with the groove and being removably received by the outer race either by axial or circumferential motion of the stop member with respect to the outer race, and
a second end of the stop member being received by the shaft; and
a retaining member received by the second end of the stop member to facilitate securing the second end of the stop member to the shaft.

11. The joint assembly according to claim 10, wherein
a groove extends axially in an outer surface of the outer race.

12. The joint assembly according to claim 10, wherein a guide member is disposed at the first end of the stop member, a first width of the guide member being larger than a second width of the groove.

13. The joint assembly according to claim 10, wherein the outer race has a first end and a second end, the groove extending axially from the first end toward the second end of the outer race.

14. The joint assembly according to claim 13, wherein
a first end of the groove is disposed at the first end of the outer race, and a second end of the groove is spaced from the second end of the outer race.

15. The joint assembly according to claim 10, wherein
the second end of the stop member is received by a circumferential groove in an outer surface of the shaft.

16. The joint assembly according to claim 10, wherein
an opening in the stop member receives the retaining member.

17. The joint assembly according to claim 10, wherein
the stop member includes a first portion and a second portion, the first portion extending substantially parallel to a rotational axis of the shaft, and the second portion extending angularly from the first portion of the stop member.

18. The joint assembly according to claim 17, wherein
the second portion of the stop member is spaced from an outer surface of the boot.

* * * * *